United States Patent [19]

Langran

[11] Patent Number: 4,725,165

[45] Date of Patent: Feb. 16, 1988

[54] PIPELINE JOINTING

[75] Inventor: Michael A. Langran, Norwich, United Kingdom

[73] Assignee: S.E.L. Services Limited, United Kingdom

[21] Appl. No.: 888,489

[22] Filed: Jul. 23, 1986

[30] Foreign Application Priority Data

Jul. 23, 1985 [GB] United Kingdom ............... 8518557

[51] Int. Cl.$^4$ ........................ F16L 1/04; F16L 58/12
[52] U.S. Cl. ...................................... 405/169; 138/97; 138/155; 249/90; 249/95; 264/35; 264/36; 264/256; 264/263; 264/271.1; 285/47; 425/544; 405/158
[58] Field of Search .............. 405/154, 155, 157, 158, 405/166, 169, 170; 285/45, 47, 294, 297; 264/35, 36, 256, 259, 263, 271.1; 138/97, 98, 99, 100, 101, 140, 145, 155; 425/544; 249/83, 90, 95

[56] References Cited

U.S. PATENT DOCUMENTS

| 2,707,984 | 5/1955 | Goff ................................... 405/154 |
| 3,368,005 | 2/1968 | Buczala et al. ..................... 264/36 |
| 3,865,662 | 2/1975 | Segal ................................. 138/99 |
| 3,949,461 | 4/1976 | Thastrup ....................... 285/297 X |
| 4,222,732 | 9/1980 | Pasch et al. ....................... 425/544 |
| 4,323,526 | 4/1982 | Hilbush ......................... 285/297 X |
| 4,395,159 | 7/1983 | Karuks et al. ...................... 405/158 |
| 4,449,852 | 5/1984 | Muszynski ..................... 405/166 X |
| 4,604,256 | 8/1986 | Greenwood et al. ............... 425/544 |

FOREIGN PATENT DOCUMENTS

| 540324 | 10/1941 | United Kingdom . |
| 1357471 | 6/1964 | United Kingdom . |
| 1312831 | 4/1973 | United Kingdom . |
| 1579125 | 11/1980 | United Kingdom . |
| 2119884 | 11/1983 | United Kingdom . |

Primary Examiner—David H. Corbin
Attorney, Agent, or Firm—Robbins & laramie

[57] ABSTRACT

In the progressive forming and laying of an undersea pipeline the welded joints between the ends of pipes pre-coated with a corrosion protection coating and an outer concrete weighting coating are protected by a mastic coating applied by clamping a mould around the pipeline joint to form a cavity between the joint and the mould, filling the cavity with mastic by forcing into it under pressure a charge of mastic at a temperature of not more than 70° C., releasing the pressure and opening and removing the mould. The mastic coating is applied up to the level of the concrete coating adjacent the joint.

10 Claims, 2 Drawing Figures

PIPELINE JOINTING

This invention relates to pipeline jointing, in particular to field jointing of pipelines for undersea use. Undersea pipelines are usually made up from lengths of line pipe which are welded together on a lay barge, the pipeline as it is formed being progressively laid on the sea bed. The line-pipes, except at their end portions, are pre-coated with a corrosion protection coating which in turn is covered with a concrete weight coating. When the uncoated ends of pipes are welded together, the joint has to be similarly protected by applying a corrosion protection coating which in turn has to be protected against mechanical abrasion. This is usually done by applying a coating of marine mastic up to the level of the concrete coating adjacent the joint. This mastic coating provides secondary corrosion protection and has the impact resistance necessary for protection against damage from trawl boards. The mastic is essentially a mixture of bituminous binder, limestone filler and aggregate of selected particle size range. Suitable compositions are described in BP No. 1494279 United Kingdom.

In the continuous welding and laying of the pipeline there is a severe time restriction on the step of protecting the welded joint before the pipe is lowered into the sea and currently, the application of the mastic coating has to be carried out in less than five minutes. The existing practice for mastic application consists of crushing planks of mastic which are heated to 180° C. in a boiler and transferred by buckets to the joint area. The mastic is then hot poured into a simple thin steel mould around the field joint which is retained on the joint during its service lifetime. No inspection of the joint is possible and the mould has to be retained around the joint because there is insufficient time for the mastic material to cool down before leaving the lay barge. This operational practice has disadvantages in that:

- the joint cannot be inspected on completion;
- the steel mould is not re-usable and, on the sea bed, is a cause of damage to fishing nets;
- the hot application technique requires considerable manpower and the machinery has significant operational and safety limitations.

We now provide an improved process which, by utilizing pressure, makes it possible to operate at much lower temperatures, to form the mastic coating in a reusable mould and to inspect the coating before the pipeline is lowered into the sea.

According to the present invention a process of forming a mastic coating on a joint in a pipeline for undersea use comprises clamping a mould around the joint in the pipeline to form a cavity between the joint and the mould, filling the cavity with mastic by forcing into it under pressure a charge of mastic at a temperature of not more than 70° C., releasing the pressure and opening and removing the mould. The temperature at which the mastic is forced into the mould depends on the flow properties of the mastic. Factors determining the flow properties of the mastic are the properties of the binder, the nature of the filler and the binder/filler ratio but we have found that the mastics at present used in the hot pouring process, in particular marine mastics D1 and D2 as supplied by Tarmac Roadstone, can be used in the new process at temperatures of about 50° C. These mastics have the following compositions:

| D1. | 17.0% by weight | Bitumen R85/25 |
|---|---|---|
|  | 19.0% by weight | Filler (Limestone) |
|  | 64.0% by weight | Aggregate 0–2.36 mm. |
| D.2. | 15.0% by weight | Bitumen R85/25 |
|  | 17.0% by weight | Filler (Limestone) |
|  | 68.0% by weight | Aggregate 0–5.0 mm. |

In general the mastics may comprise 8–22% wt. bitumen, 8–25% wt. filler passing a 75 microns sieve and 53–84% wt. of aggregate of a grading range from larger than 75 microns to a maximum particle size of from 2.36 mm to 37.5 mm, the percentages being by total weight of bitumen, filler and aggregate, and the aggregate having a grading curve close to a modified Fuller curve for particles of the maximum particle size chosen, said modified Fuller curve being the Fuller curve recalculated to exclude material passing 75 microns.

The mastic may be used in bulk form, e.g. in the form of a cartridge of dimensions suitable for insertion in the moulding apparatus. Preferably, however, the mastic is used in a particulate form made by chopping the bulk mastic, the minimum particle size being limited by the maximum size of the aggregate used in the mastic.

Flow properties can be determined by charging with the mastic, a heatable cylinder having an orifice plate at one end and at the other a plunger to which pressure can be applied. The orifice in the plate is suitably 10% larger than the maximum diameter of the aggregate used in the mastic. The mastic can be heated up to a temperature of about 70° C. and pressures of up to about 50N/mm$^2$ can be applied. By this means a mastic having suitable flow properties at particular temperatures and pressures may be selected.

Another check on the effectiveness of the pressurized application of the mastic can be made by measuring the density of the mastic coating so produced. In the case of the D1 and D2 mastics referred to above, the density of hot poured material is 2.0 to 2.15 gms/cm$^3$. When pressure moulded under pressures of from 20 to 70N/mm$^3$ the density of the material is between 1.9 and 2.1. The lower densities indicate that some air remains dispersed in the mastic but we have found that up to about 5% by volume of dispersed air can improve the impact strength of the coating without significantly reducing the impermeability.

The invention is illustrated with reference to the accompanying drawings in which.

Figure 1:
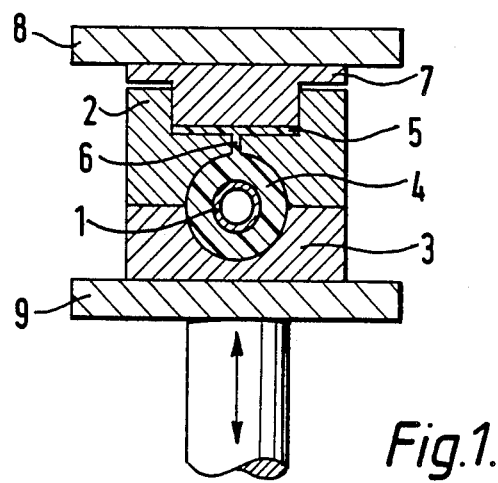
FIG. 1 shows in section an integral pot moulding system.

In FIG. 1, a joint in pipeline 1 is enclosed in two parts 2 and 3 of a mould to provide a cavity 4. The length of the cavity is defined by the ends of the concrete coatings on the pipes joined at that point and the diameter of the cavity corresponds to the diameter of the concrete coatings. Mastic heated to 50° C. is loaded into a recess 5 in the upper part 2 of the mould, the recess 5 being connected to the cavity 4 by a sprue 6. The recess 5 is closed by a plate 7 having a projection which is a sliding fit in the recess. The whole assembly is positioned between two plates 8 and 9 of a hydraulic press. When pressure is applied to the loaded assembly it not only holds the two parts 2 and 3 of the mould together but also forces the charge of mastic in recess 5 through the sprue 6 and into the cavity 4. In order to avoid leakage of mastic from the mould between parts 2 and 3, the cross sectional area of the recess 5 must be at least 10% larger than the cross sectional area of the mould in a plane in line with the joint between parts 2 and 3. Air in the cavity can be expelled between parts 2 and 3 and when coating large diameter pipe joints separate air vents can be provided.

Figure 2:
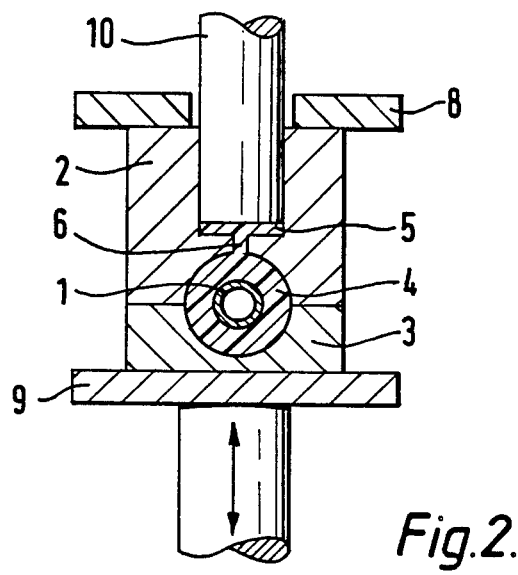
FIG. 2 shows in section an auxiliary ram moulding system.

An alternative arrangement is illustrated in FIG. 2. In this case the two parts of the mould 2 and 3 positioned around the joint in pipe 1 to form a cavity 4 are held together by plates 8 and 9 of a hydraulic press but the charge in recess 5 is forced through the sprue 6 by an auxiliary ram 10.

In a further development of the arrangement shown in FIG. 2 two or more rams may be used to feed mastic into the mould cavity.

As illustrated in FIGS. 1 and 2 the pressure moulding process is substantially completed. At the dend of the moulding process, the pressure on the ram and/or press is released and the two parts 2 and 3 of the mould are separated and removed. This can be done even when the mastic is moulded at a temperature as high as 70° C. The mastic coating can then be inspected before that section of the pipeline is lowered into the sea.

Coatings formed from chopped mastics D1 and D2 applied in this way at a temperature of 50° C. and at pressures between 20 and 70N/mm$^2$ exhibited room temperature impact values (as determined by a drop weight impact tester) of between 12 and 27 for D1 and 10 and 17 for D2, all values being well above the specification figure of 7.

Moulding can be carried out at temperatures as low as 30° C., but preferably is carried out at temperatures of from 40° to 60° C.

I claim:

1. A process of forming a mastic coating on a joint in a pipeline for undersea use comprising clamping a mould around the joint in the pipeline to form a cavity between the joint and the mould, filling the cavity with mastic by forcing into it under pressure a charge of mastic at a temperature not more than 70° C., releasing the pressure and opening and removing the mould.

2. A process as claimed in claim 1 in which the charge of mastic is at a temperature of from 40° to 60° C.

3. A process as claimed in claim 1 in which the mastic to be charged is in cartridge form.

4. A process as claimed in claim 1 in which the mastic to be charged is in chopped form.

5. A process as claimed in claim 1 in which the mastic is essentially a mixture of bituminous binder, filler and aggregate of selected particle size range.

6. A process as claimed in claim 1 in which the mastic comprises 8–22% wt. bitumen, 8–25% wt. filler passing a 75 microns sieve and 53–84% wt. of aggregate of a grading range from larger than 75 microns to a maximum particle size of from 2.36 mm to 37.5 mm, the percentages being by total weight of bitumen, filler and aggregate.

7. A process of making a pipeline for undersea use which comprises pre-coating pipes, except at their end portions, with a corrosion protection coating followed by a concrete weight coating, welding said pipes together at their ends and coating the welded un-pre-coated end portions with mastic by a process as claimed in claim 1 to produce a mastic coating corresponding in diameter to that of the pre-coated portions of the pipes.

8. A continuous process of making a pipeline for undersea use as in claim 7 in which the process as claimed in claim 1 is carried out immediately after the welding together of the respective pipe ends, and which additionally comprises inspecting the mastic joint after removing the mould and progressively lowering the so-formed portion of pipeline into the sea.

9. A pipeline having a mastic coating on welded joints between pipe ends, the mastic coating having been produced by a process as claimed in claim 1 and having a density of between 1.9 and 2.1 gms/dm$^3$.

10. A continous process of making a pipeline for undersea use comprising: welding together the respective pipe ends, forming a mastic coating by a process as claimed in claim 1 which comprises clamping a mould around the joint in the pipeline to form a cavity between the joint and the mould, filling the cavity with mastic by forcing into it under pressure a charge of mastic at a temperature not more than 70° C., releasing the pressure and opening and removing the mould, inspecting the mastic joint after removing the mould and progressively lowering the so-formed portion of pipeline into the sea.

* * * * *